Sept. 29, 1970 M. CAMRAS 3,531,600

MAGNETIC TRANSDUCER HAVING CONDUCTIVE MEANS SPANNING POLE FOR SUPPLYING BIAS

Filed Oct. 5, 1965 9 Sheets-Sheet 1

INVENTOR.
MARVIN CAMRAS

BY James W. DeSimone
ATTORNEY

Sept. 29, 1970 M. CAMRAS 3,531,600

MAGNETIC TRANSDUCER HAVING CONDUCTIVE MEANS SPANNING POLE FOR SUPPLYING BIAS

Filed Oct. 5, 1965 9 Sheets-Sheet 2

INVENTOR.
MARVIN CAMRAS

BY

James W. DeSimone
ATTORNEY

INVENTOR.
MARVIN CAMRAS
BY
James W. DeSimone
ATTORNEY

INVENTOR.
MARVIN CAMRAS
BY James W. DeSimone
ATTORNEY

INVENTOR.
MARVIN CAMRAS
BY James W. Dent [signature]
ATTORNEY

INVENTOR.
MARVIN CAMRAS
BY
James W. DeSimone
ATTORNEY

INVENTOR.
MARVIN CAMRAS
BY
James W. DeSimone
ATTORNEY

INVENTOR.
MARVIN CAMRAS
BY James W. DeSimone
ATTORNEY

Sept. 29, 1970 M. CAMRAS 3,531,600

MAGNETIC TRANSDUCER HAVING CONDUCTIVE MEANS SPANNING POLE FOR SUPPLYING BIAS

Filed Oct. 5, 1965 9 Sheets-Sheet 9

INVENTOR.

MARVIN CAMRAS

BY James W. DeSimone

ATTORNEY

United States Patent Office 3,531,600
Patented Sept. 29, 1970

3,531,600

MAGNETIC TRANSDUCER HAVING CONDUCTIVE MEANS SPANNING POLE FOR SUPPLYING BIAS

Marvin Camras, Glencoe, Ill., assignor to IIT Research Institute, Chicago, Ill., a corporation of Illinois Continuation-in-part of applications Ser. No. 126,121, July 24, 1961; Ser. No. 389,021, Aug. 12, 1964; and Ser. No. 401,832, Oct. 6, 1964. This application Oct. 5, 1965, Ser. No. 493,271
Int. Cl. G11b *5/20, 5/24, 5/56*
U.S. Cl. 179—100.2 4 Claims

ABSTRACT OF THE DISCLOSURE

A transduced system comprising a longitudinal scan transducer head, tape deck and related electronics enabling the recording of audio and video signals wherein a pair of cross field conductors traverse the poles of the transducer head in a symmetrical configuration for producing a cross field component during recording operation in either direction of tape movement. The playback amplifier includes a frequency responsive feedback network providing a signal phase shift related to the phase shift which occurs in the response of high and low impedance playback windings as a function of playback signal frequency.

CROSS REFERENCES TO RELATED APPLICATION

This application is a continuation-in-part of my U.S. applications Ser. No. 126,121 filed July 24, 1961 (now U.S. Pat. 3,334,192 issued Aug. 1, 1967), Ser. No. 389,021 filed Aug. 12, 1964 (now Pat. No. 3,469,037) and Ser. No. 401,832 filed Oct. 6, 1964, all of which are incorporated herein by reference.

This invention relates to an instrument, consisting of a recording head, tape deck, and related electronics which enables the recording of audio and video signals and playback of such signals including conventional television signals.

Heretofore, the acceptable video recording and reproduction was only obtainable by the use of expensive complex, electrical and mechanical components.

Good video recording and reproduction without the use of such expensive or complex components is possible through the use of a recording and playback head having exceptional performance characteristics. The cross-field head described herein provides such characteristics. The cross-field microgap head produces a highly concentrated magnetic field at the point of magnetization. The result is either improved picture fidelity or a longer uninterrupted recording period, whichever is desired.

Simplicity is a very important feature of the design. The electronic system and tape deck are comparable in size and complexity to those of a conventional audio tape recorder. For example, the electronics system uses only four tubes and one transistor or three tubes and two transistors. If designed for transistors alone, only six would be needed.

The system described here can use standard quarter-inch recording tape and seven-inch reels. Ten channels can be recorded on each tape. At a tape speed of 120 inches per second, one channel records six minutes of program material and ten channels would record an hour. At the end of each six-minute recording interval, the head is mechanically raised by means of a head positioner to a new channel position, and the tape direction is reversed. Each channel is twenty mils wide and there is a five-mil separation between channels. A lower tape speed (i.e., sixty inches per second) can also be used to increase playing time.

It is accordingly an object of this invention to provide a magnetic video recording consisting of a recording head, tape deck and related electronics.

It is another object of this invention to provide a novel video recorder of relatively simple non-complex design.

It is a further object of this invention to provide a magnetic video electronics system wherein the tape deck and the electronics are comparable in size and complexity to those of a conventional audio tape recorder.

It is a further object of this invention to provide a novel magnetic video recorder enabling good video reproduction without the use of expensive complex components by the use of a record-playback head having exceptional performance characteristics.

It is a further object of this invention to provide a novel improved video recorder utilizing a cross-field microgap head to provide a highly concentrated magnetic field with a sharp field-gradient at the point of magnetization. The foregoing and additional objects will become more apparent to the reader from the following detailed description taken in connection with the accompanying drawings in which FIG. 1 is a schematic representative of the critical zone near the recording gap with a cross-field head;

Figures 2, 6, 6A, 6B:
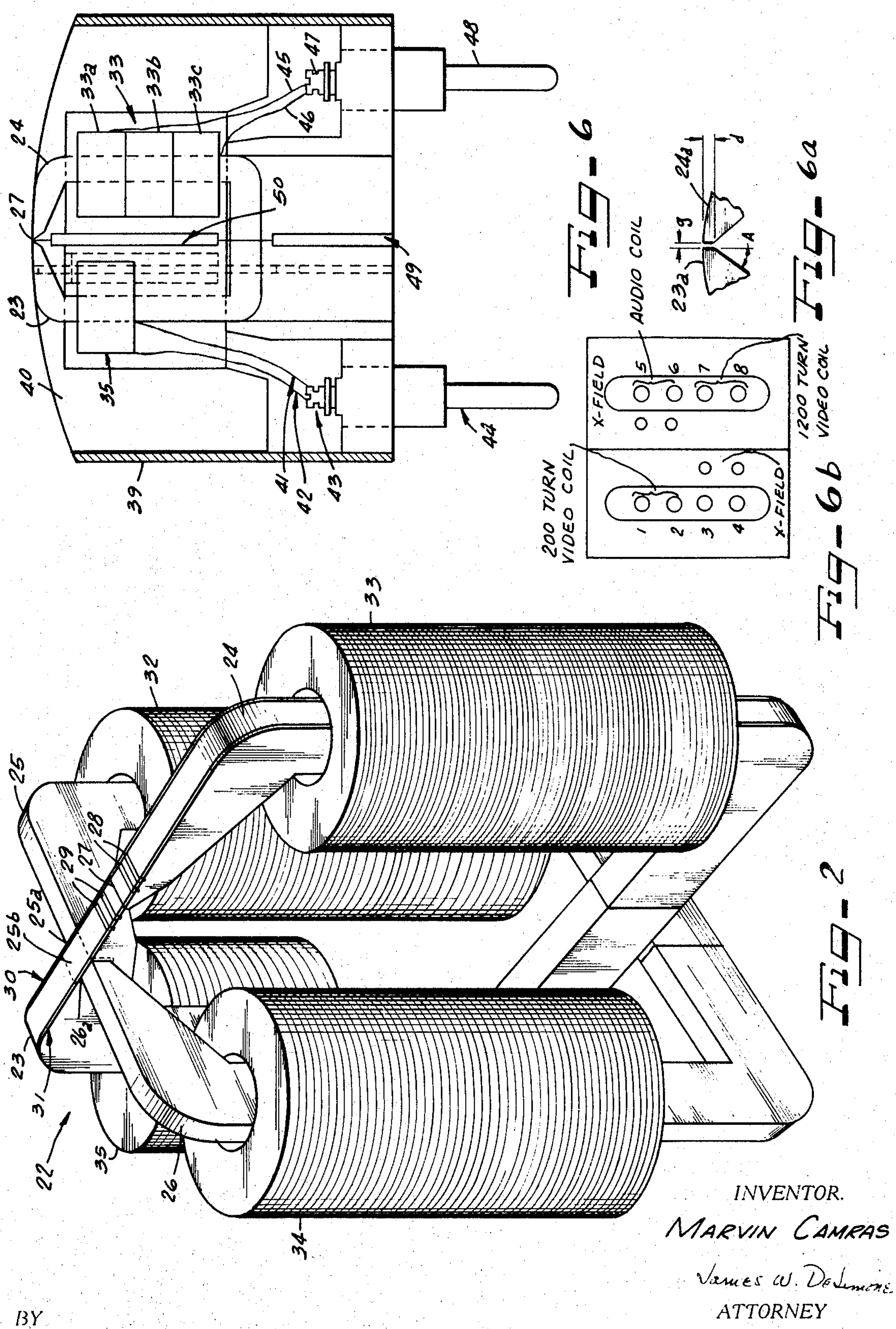
FIG. 2 is a diagrammatic view illustrating the principal parts of a preferred record-playback head in accordance with the teachings and practices of this invention.
FIG. 6 is a schematic view of the cross-field record-playback head.
Figures 4, 5, 9:
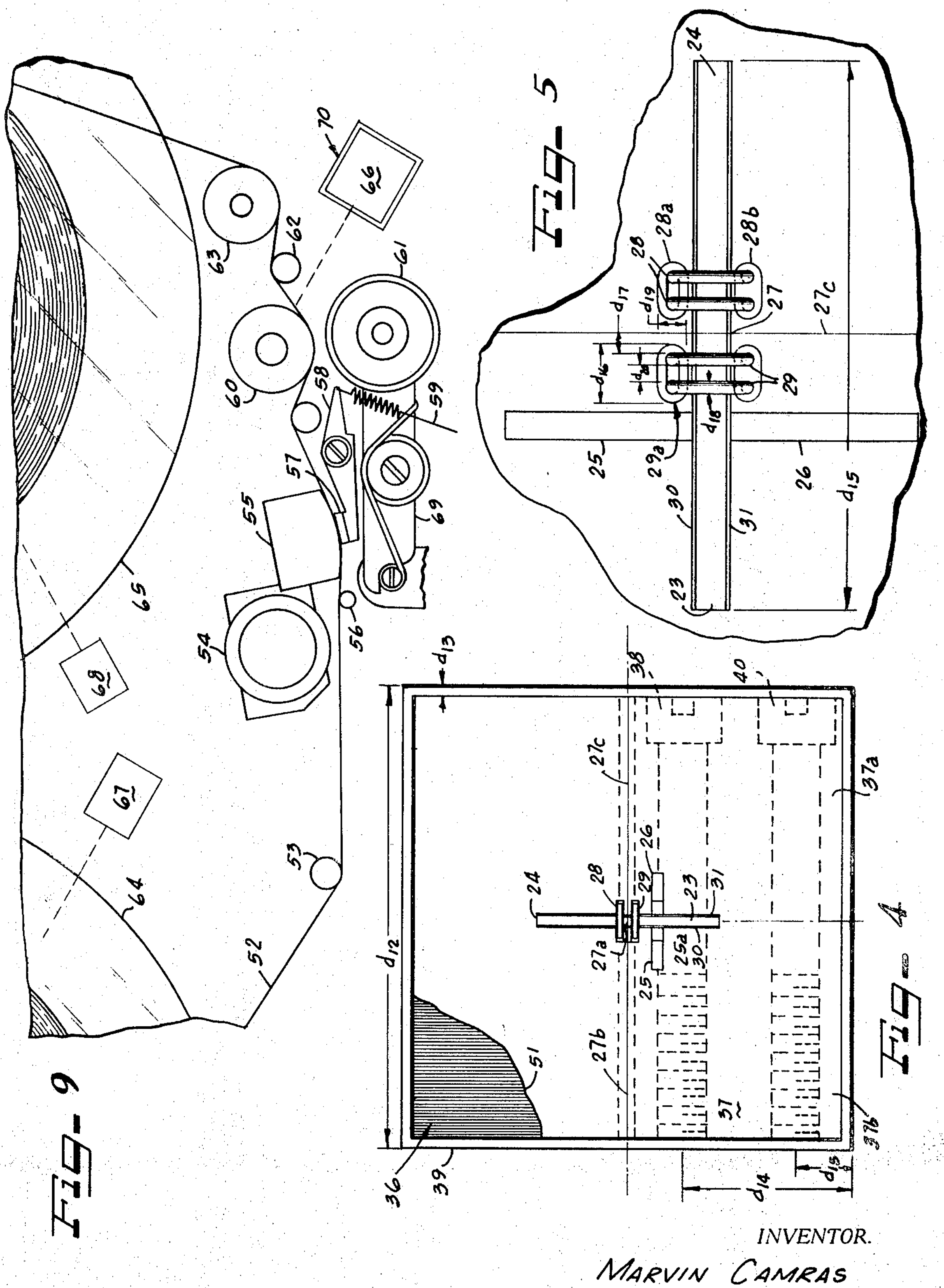
FIG. 4 is a top view of a preferred embodiment of an assembled cross-field head according to the instant invention.
FIG. 5 is a top view of a record-playback head of the instant invention more clearly showing the cross-field loops.
Figures 7, 8, 10, 11:
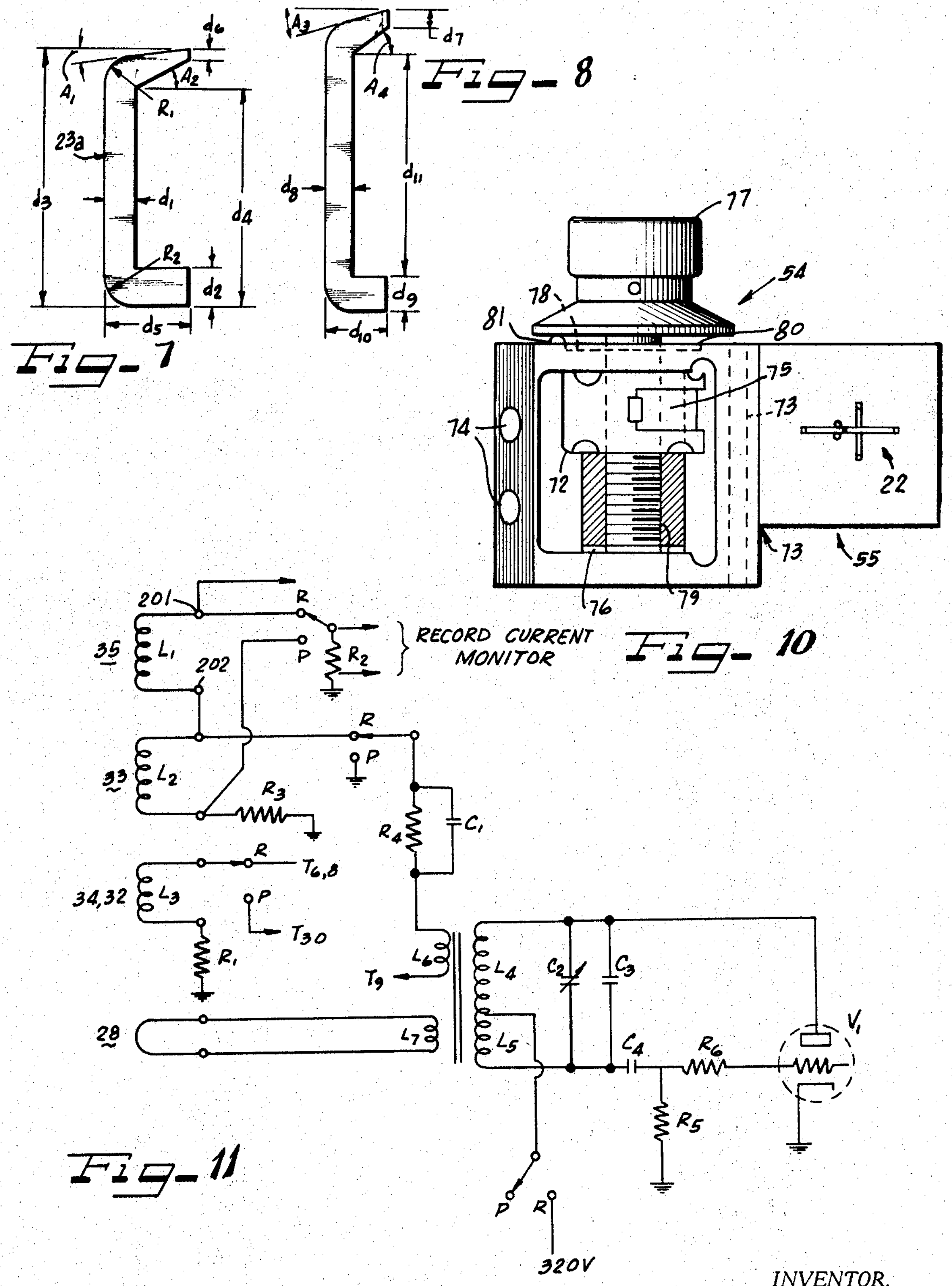
Figure 12:
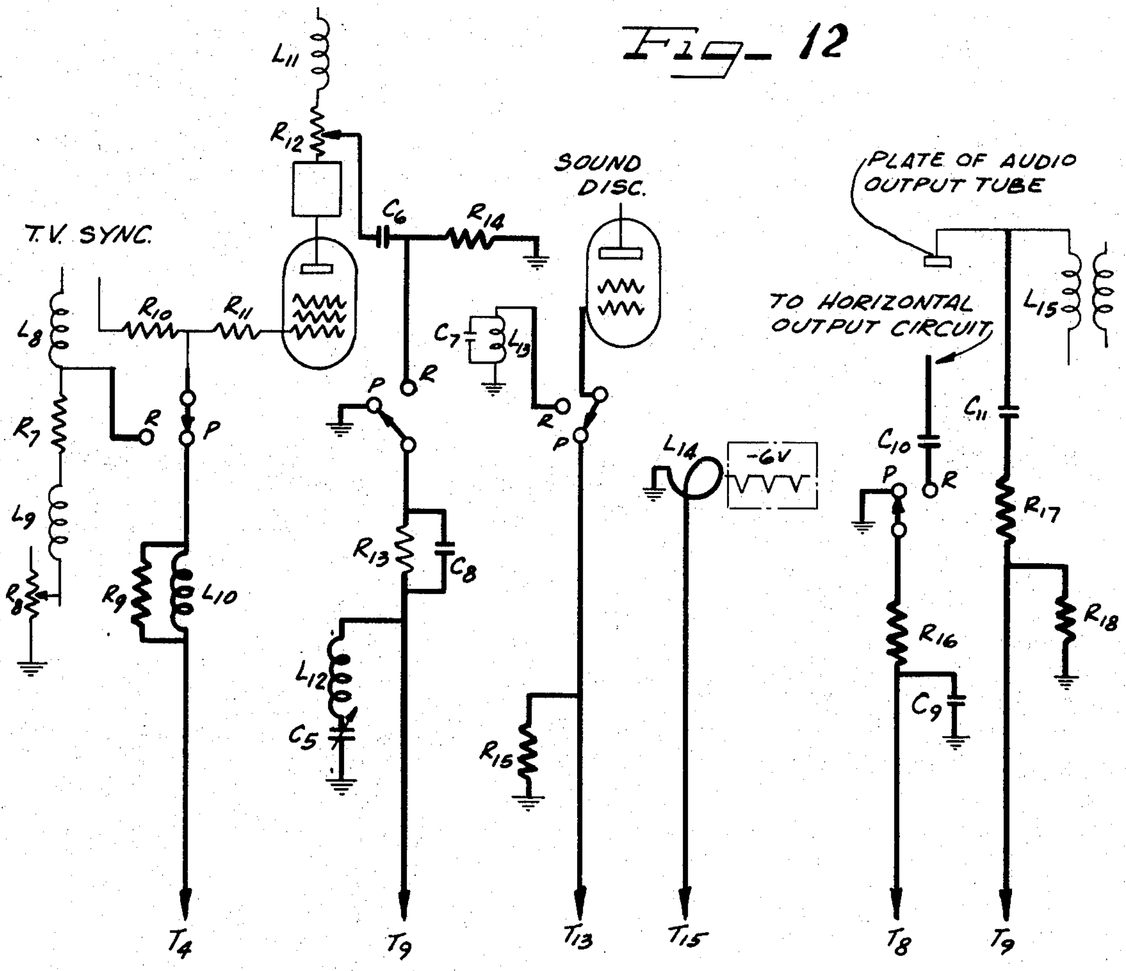
Figure 14:
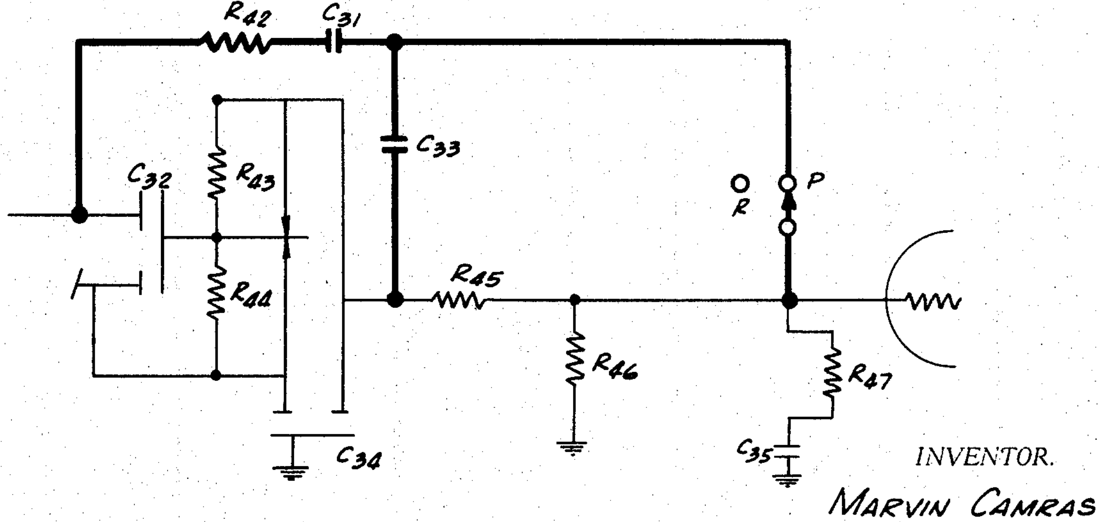
Figure 13:
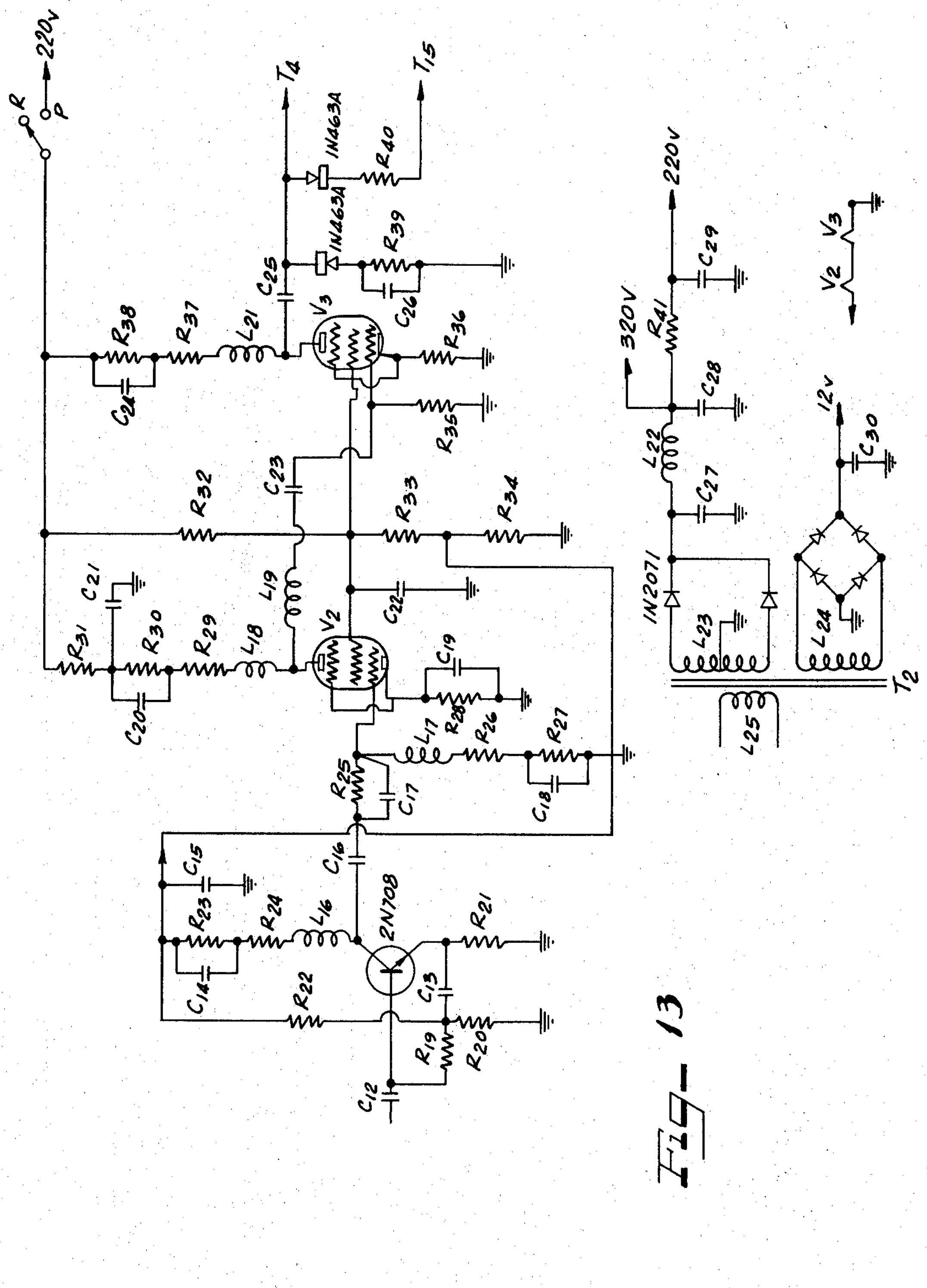
Figure 15:
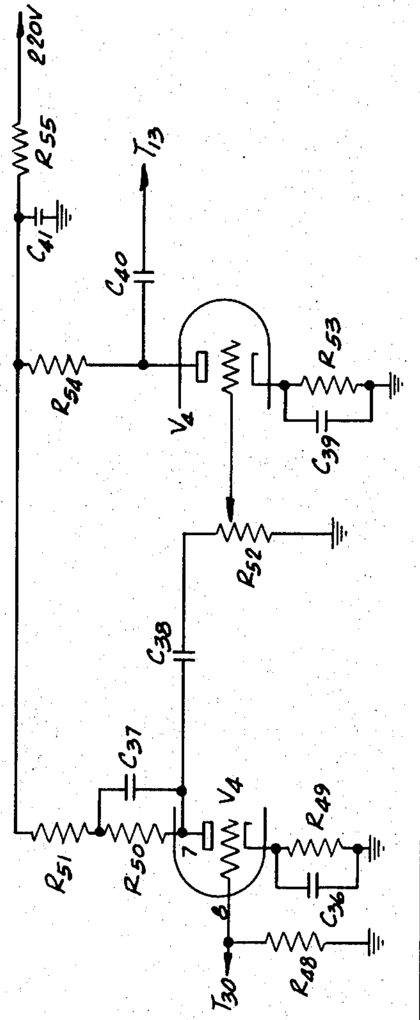
Figure 16:
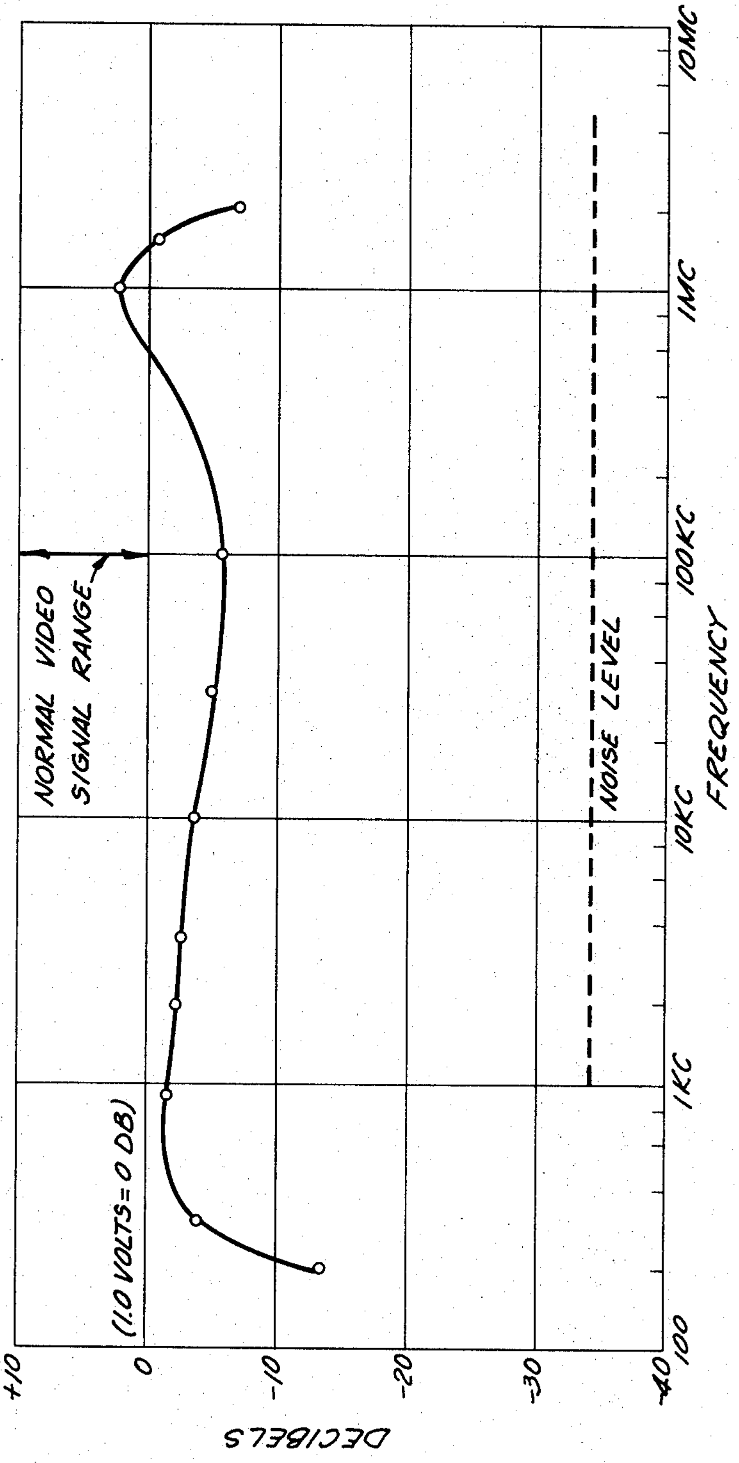
Figure 17:
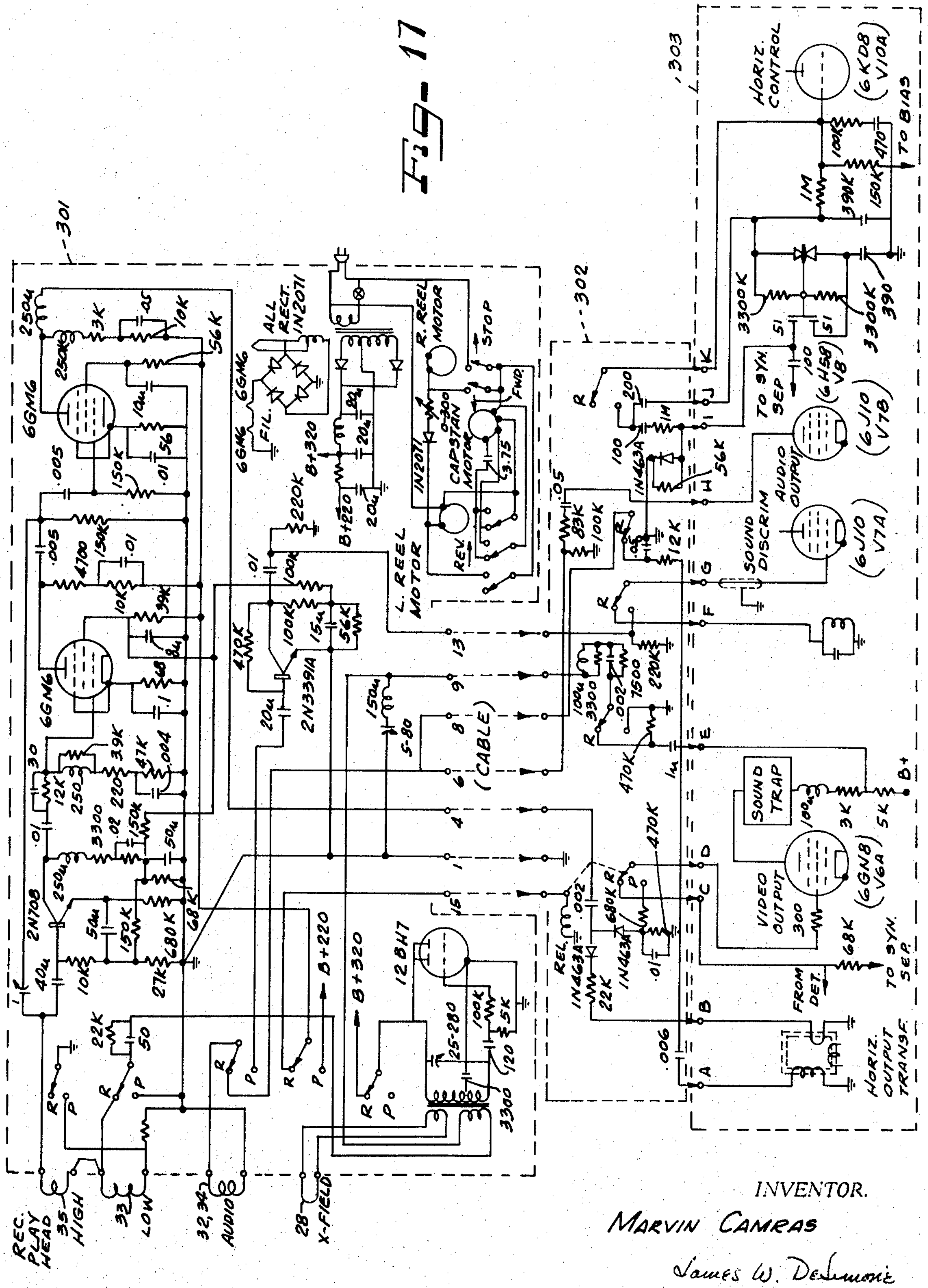
Figure 18:
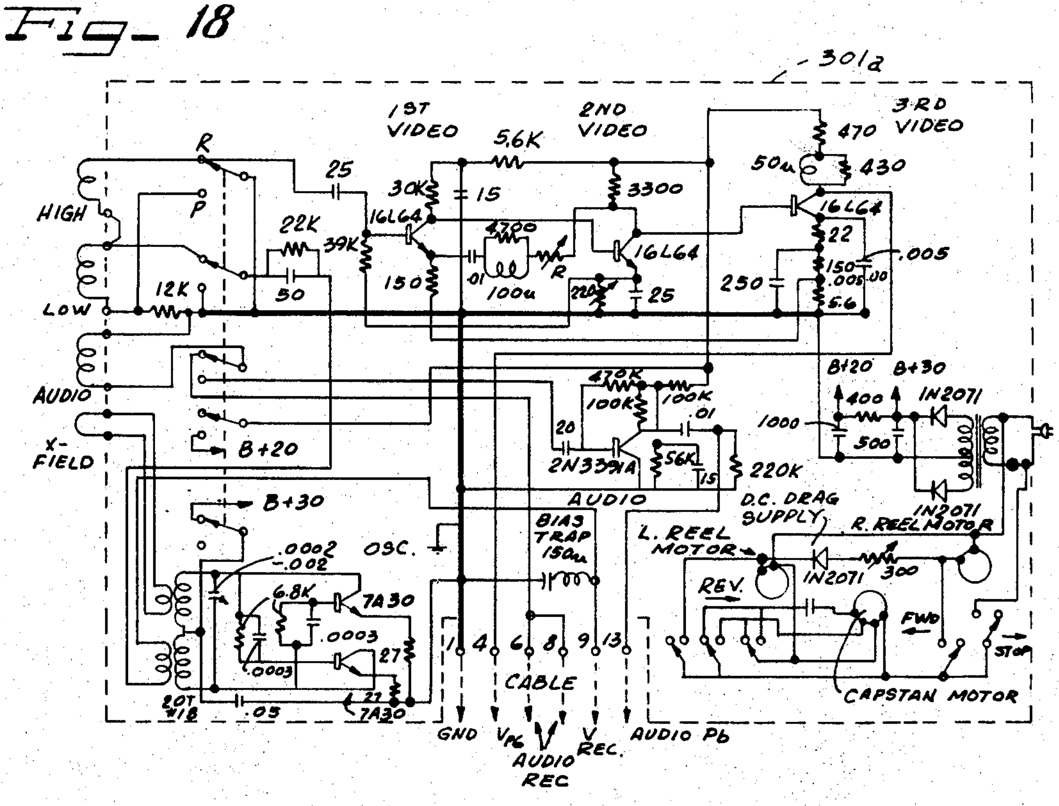
Figure 19:
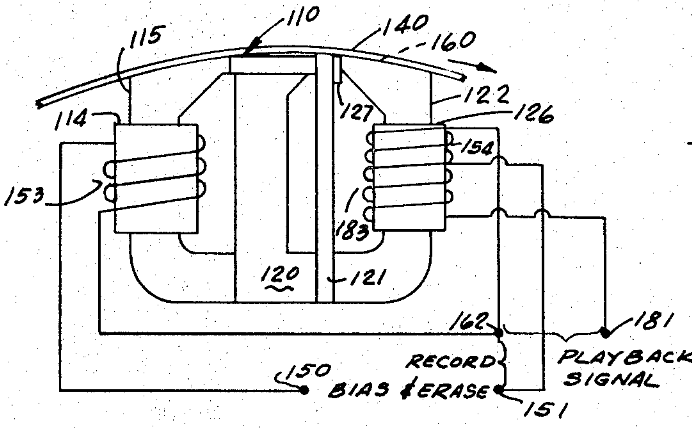
Figure 20:
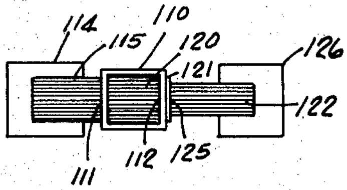

FIG. 6*a* is an enlarged view of the pole tips of the record-playback head;

FIG. 6*b* is a bottom view of the head assembly;

FIG. 7 is a side view of a lamination of the video core;

FIG. 8 is a side view of a lamination of the audio core;

FIG. 9 is a top view of the tape transport system;

FIG. 10 is a view of the head positioner assembly;

FIG. 11 is a wiring diagram of the recording head and video bias oscillator;

FIG. 12 is a schematic of the modifications in the video and audio amplifiers of a TV set wherein the circuit modifications are depicted by the heavy lines;

FIG. 13 is a schematic of the video playback amplifier;

FIG. 14 is a schematic of the horizontal control circuit of a conventional TV set as modified for magnetic record and playback operation with such modifications depicted by the heavy line;

FIG. 15 is a schematic of the audio playback amplifier;

FIG. 16 is a plot of the overall record-playback frequency response of the recorder;

FIG. 17 is a schematic of the system electronics;

FIG. 18 is a schematic of transistorized record-playback electronics exclusive of the TV set;

FIG. 19 is a diagrammatic illustration of an alternative embodiment of a wide band magnetic head; and FIG. 20 is a top plan view of FIG. 19.

Referring now to FIGS. 1, 2, 4, 5 and 6, the transducer head 22 is a precision component containing a number of elements that must be manufactured and assembled to close tolerances, however, the problems involved should be no greater than are encountered in the manufacture of a head for high-fidelity stereo sound recording. The head 22 consists essentially of two high-permeability cores, 23–24 and 25–26, with associated windings, 33, 35 and 32, 34, and two loops of copper wire 28 and 29 to produce the cross-fields. These components are encased in a bronze housing 39. Both the simplicity of the design and the nature of the materials involved promote reliability. Head life is estimated at more than 1000 hours.

The experimental unit constructed establishes the technical feasibility of the system, as well as its economic attractiveness.

A use of the recorder is expected to be the recording of live video transmissions for later playback. In addition, it may be used for playback of pre-recorded tapes provided by a central supplier. The unit could also be used in conjunction with an inexpensive television camera to obtain home movies by means of on-the-spot recording.

The design is versatile, allowing wide latitude in the selection of basic components (tape, deck, drives, etc.) that are modified to construct the recorder. Clearly many alternative designs based on the principles used here are possible.

The detailed description of the system is presented in terms of its three essential parts: (1) the design and construction of the cross-field microgap combination (hereinafter referred to as "*x*-field") recording and playback head 22; (2) the modifications of a conventional tape deck to provide a lineal tape speed of 120 inches per second and to adapt it to the consecutive recording in ten channels on the tape; and (3) a description of the electronic circuits and the associated modifications required in the conventional television receiver to be used with the recorder.

Basically, the *x*-field principle is a means of producing a more concentrated magnetic field at the critical recording zone. (See FIG. 1.) This is accomplished by superimposing a second magnetic field, called the *x*-field, on the original field created at the microgap. When the second field is added a narrow, concentrated magnetic field of high gradient is the result at the trailing pole 21. For a more detailed analysis of the *x*-field principle the reader's attention is directed to my paper appearing in the IEEE Transactions on Audio entitled "An X-Field Micro-Gap Head for High Density Magnetic Recording" volume A4–12, No. 3, May-June, 1964 incorporated herein by reference.

The most widely used recording head is an electromagnet with a very small gap over which the tape passes. A magnetic field is created around the gap which is semicircular in shape. The field is strongest at the gap and becomes weaker with distance from the gap. Intensity at the gap may be 2000 oersteds, decreasing to 200 oersteds at a distance of 18 microns from the gap. For recording purposes an important characteristic is remanent magnetization after the tape has been subjected to a field. A curve representing the relationship between applied magnetic field and remanent magnetization would show that applied fields below 225 oersteds have very little effect on the tape. Hence, this would represent the outer boundary of the critical recording zone.

Where high-frequency bias is used for linear recording, an "inner" boundary also exists within which the bias field is so strong that whatever recording takes place on one cycle may be cancelled out on the reverse cycle. When the high frequency field is stronger than 300 oersteds, most domains are being reversed at each cycle of the high frequency bias. For these reasons, recording occurs in a critical region where the bias field is falling from 300 to 225. In a typical head and tape relationship this region is spaced about two gap lengths away from the gap and extends for about 8 microns along the path through which a point in the outermost portion of the tape passes and about 4 microns in the path where a point in the innermost portion of the tape passes.

Figure 1:
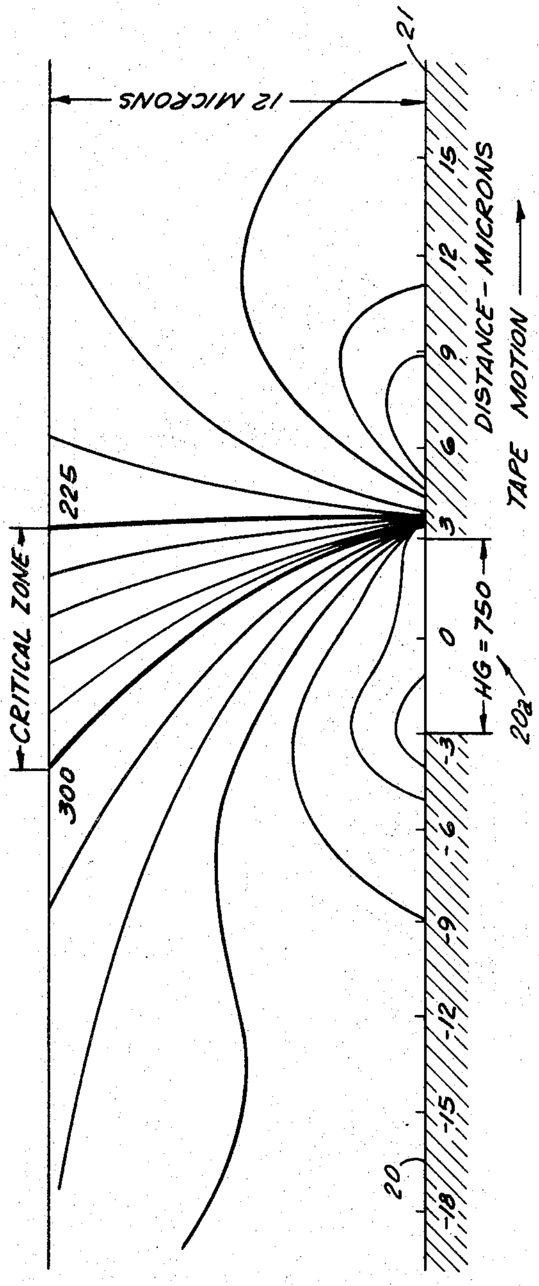

Recording resolution can be improved by sharpening this critical zone, especially at the bottom surface of the tape layer adjacent to the gap 20*a*. When the semicircular field of a conventional head is modified by adding a vertical field (cross-field), the resultant is more intense at one edge of the gap 20*a*, but has a sharper gradient at the outer edge (FIG. 1). With the *x*-field, head, the critical zone bounded by the 225 and 300 oersted contour lines is wedge-shaped, as shown in the figure with its sharpest point at the head surface (the surface of trailing pole 21), where the short-wave-length recording takes place. The recording field is nearly horizontal for an extensive area within the critical zone. Also, adequate biasing and recording are obtainable through thicker magnetic layers with weak gap fields. The *x*-field head is used for both recording and playback, eliminating the need for separate heads.

Figure 3:
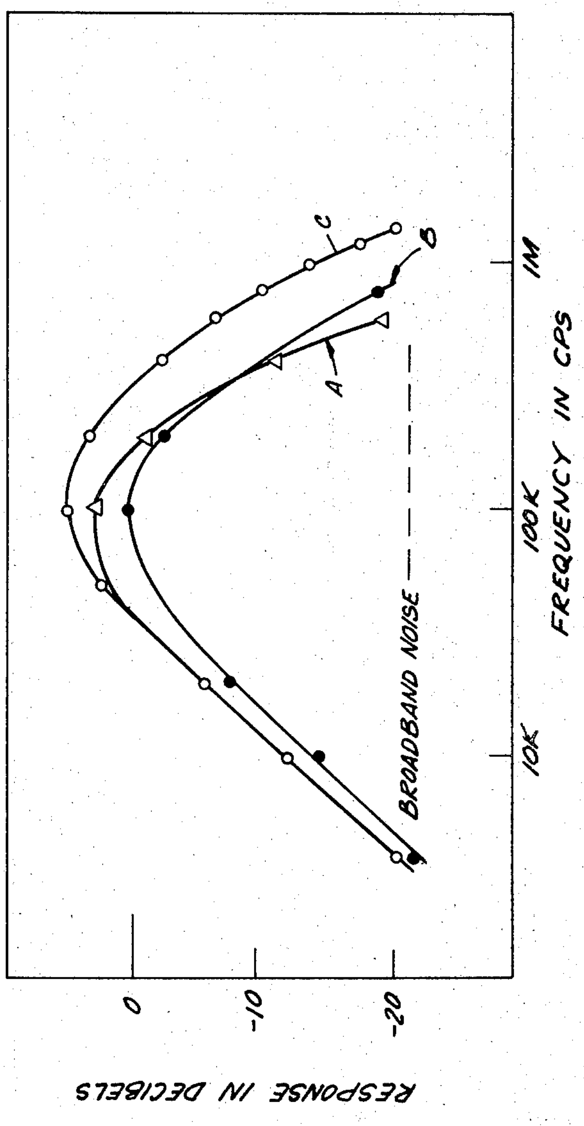
FIG. 3 is a series of curves showing the responses of conventionally operated heads versus a cross-field head illustrating the improvement obtained thereby.

The improvement in performance through the use of the *x*-field head is indicated by the group of constant current response curves presented in FIG. 3. In constructing these curves, recording was by means of the *x*-field head 22 with (A), Conventional bias, (B), No bias, and (C), Cross-field bias. A separate head was used for playback with the same head used in all three cases.

Curve A is the performance of the head when used in the conventional manner, that is, with the signal and bias mixed in the signal winding 35; and a bias frequency of 4 megacycles.

Curve B shows the performance of the same head without bias. The high-frequency response is somewhat better, since there is no bias to erase these frequencies, but the low frequencies are weaker and distorted. (The recording was made with a 1 milliampere signal current applied to the signal winding 35).

Curve C is the performance of the same head with the *x*-field in use. Both the high-frequency and low-frequency responses are greatly improved. (The recording was made with a *x*-field bias of 0.4 ampere applied loop 28 or 29 as the case may be; and 8 milliampere bias current applied to the signal winding 35; and a signal current of 0.8 milliampere).

Head 22 records and plays back both the composite video and the audio parts of a television signal. The composite video signal is recorded longitudinally on the tape with a track width of 16 mils which is the width of confronting pole pieces 23 and 24. The audio signal is recorded transversely to the motion and in the plane of the tape on both sides of the video track. The magnetic structure of the audio portion of the recording head consists of two 15-mil single lamination pole pieces 25 and 26, one on each side of the video magnetic structure cores 23 and 24 and forms 0.002 inch gaps. The audio gap is formed by the brass spacers 30 and 31 each 0.002 inch thick. In this configuration a portion of the video cores 23–24 provides a part of the low-reluctance path for the magnetic field of the audio heads 25–26, or a high permeability insert 25*b* may be used as shown in dotted lines in FIG. 2, to complete the audio magnetic path, and to isolate it from the video magnetic path. Pole pieces 23 and 24, the video portion of the head, utilize a stack of Permalloy laminations 0.5 mil thick. Hence, the entire track width on the tape, consisting of 16 mils of video information with two 2-mil transverse audio recording, occupies 20 mils of tape width. Allowing for 5 mils of separation between tracks, it is possible to record ten channels on a standard quarter-inch wide magnetic tape. Using a ½ mil thick recording tape on a 7-inch reel it is therefore possible to record one hour of a regular television program.

The recording head 22 consists of two high-permeability cores 23–24 and 25–26, for the video and audio recording respectively, and two loops of copper wire 28 and 29 to produce the cross-field. The high permeability cores are provided with proper windings and the entire assembly is contained in a bronze housing. More particularly, windings 32 and 34 receive bias and audio mixed together to record the audio tracks on respective opposite sides of the video track. Winding 33 on pole 24 is a high impedance video playback only winding. Winding 35 on pole 23 is a low impedance video record and playback winding. On video playback winding 33 is most effective at the lower band of the video signals and winding 35 is most effective at the upper band of the video signals.

FIG. 4 represents the top view of the recording head. The housing is made of three parts 36, 37*a* and 37*b*; their boundaries are defined by the central axes of the view shown. Parts 36 and 37 consist of symmetrical halves of the recording head, and part 37 is again split down the middle into parts 37*a* and 37*b*. It is in the separation of parts 36 and 37 that the gap 27 of the video core is formed. In order to obtain a 50-microinch gap the two halves 36 and 37 must be lapped to optical flatness. On each side of the video gap 27, at the top of the head 22, are placed loops of wire 28 and 29. The details of this arrangement are shown in FIG. 5. The two loops of wires 28 and 29 are energized with the biasing current and produce a corresponding magnetic field which is normal to the face of the recording head 22. It should be noted that only one loop is energized at any given time. That is the loop on the leading side of gap 27 in the direction of tape travel is activated during recording. Part 37 of the recording head is divided into two halves, 37*a* and 37*b*, in order to provide a means of inserting the audio cores 25–26 are formed by inserting brass spacers 30 and 31 along the video core. Hence, the magnetic flux in the audio core passes through a portion of the video core or permeable insert 25*b* in the cores 23–24. The brass spacers 30 and 31 are 0.002 inch thick and are inserted along the laminations of the video core. Parts 37*a* and 37*b* are secured together by means of two 2–56RH brass screws 38 and 40. Upon completion of the entire assembly the top of the recording head is lapped to provide a smooth surface to attain intimate contact with the tape.

Construction of the recording head can be described most readily by giving a detailed account of the fabrication procedure employed. Although no attempts were made during the construction of these heads to simplify the process of fabrication, remarks are included in the following description to indicate the various aspects of the design and latitudes available in a simplified method of fabrication.

FIG. 6 represents a schematic view of the assembled head. The outline of the video core with its two windings is shown in FIG. 6. The video core is formed by two pole pieces 23 and 24 and each pole piece consists of about 28 laminations, (23*a* and 24*a* respectively) each 0.5 mil thick, cemented together. (The exact number of laminations 23*a* and 24*a* is determined by the required thickness of the entire stack which is 16 mils). The detailed dimensions of the video pole piece laminations shown in FIGS. 6*a* and 7 are listed below: (Table A). The laminations are made of molybdenum permalloy 4–79 (79% nickel, 4% molybdenum and balance of iron). After being cut to size the laminations 23*a* and 24*a* are straightened by rubbing between glass plates and then are cleaned in acetone. Each lamination is coated with magnesium methylate; they are then stacked together between mu-metal plates and are subjected to a heat treatment in a hydrogen atmosphere and are annealed at 2000° F. The pole pieces are formed by stacking four laminations at a time, using vinyl seal which is cured at 150° F. for 15 minutes, and then the stacks of four are added to form the final video pole pieces 23 and 24 each with a total thickness of 16 mils. The above method of construction of the core was found useful mainly because of the tolerances required in winding and in the placing of the pole pieces in the housing.

The windings 33 and 35 of the video core structure are wound directly on the lamination stacks without a coil form. Two windings are used, and they are connected in series. Winding 35 on the left, as shown in FIG. 6 is on the audio half of the head (i.e., the portion of the head which contains the audio core) consists of 200 turns of No. 40 wire, 25 turns per layer, and is insulated by 3 mil Mylar. Winding 33 on the right contains 1200 turns of No. 44 wire which are grouped in three coils 33*a*, 33*b* and 33*c* connected in series to reduce capacity. The details of the series connections of the two video windings 33 and 35 and their functions are discussed later in the section on the system electronics.

The audio cores 25–26 consists of a single lamination of the same type permalloy and, similar to the video core, is made of two halves. The shape and dimensions of this core are given in FIG. 8. The windings 32 and 34 for the audio core are connected in series, 1000 turns of No. 44 wire each. The two windings are located symmetrically on the audio pole pieces 25 and 26, one winding on each pole piece.

The entire assembly of the two cores, video and audio, is placed in a bronze housing 40 which is made of three parts. The slots which accommodate the video and audio core structures are essential factors in the fabrication of the housing. These must be milled with the tolerances which will assure a snug fit of the assembled cores. It should be noted that the video core structures 23 and 24 has brass laminations 30 and 31, 2 mils thick, on both of its sides, which form the required gaps for the audio core. These brass laminations 30 and 31, however, do not extend through the video windings thus reducing magnetic leakage and eddy current losses. All other dimensions are not of close tolerance in the initial assembly of the housing. It is only in the later lapping of the parts of the housing that high accuracy is required. The connections to windings 33 and 35 are provided by prongs 44 and 48 as shown in FIG. 6. Bronze housing 40 includes relief slots 49 and 50 to obviate any irregularities in gap definition and alignment. Winding 35 has leads 41 and 42 for connection to an external source. Lead 41 is connected to terminal lug 43 which is electrically integral with prong 44. Lead 42 is connected to another lug (not shown) behind lug 43 which is also connected to a projecting prong (not shown) for connection to an external source. Similarly, winding 33 is adapted for connection to an external source as is partially shown by leads 45, 46, lug 47 and prong 48. The head assembly is then surrounded by a magnetic shield 39 which in this case was constructed of permalloy.

The cross-field (or *x*-field) is obtained by locating two wires 28 and 29 in the form of loops in the vicinity of the microgap 27 as best seen in FIG. 5 to provide the proper magnetic-field gradient in the tape as the latter leaves the region of the gap. Two such loops are constructed, on both sides of the gap, to provide an *x*-field for recording in both directions of tape motion. The details of the *x*-field loop construction are given in FIG. 5. Each loop passes around the video core into openings 29*a*, 29*b* and 28*a*, 28*b* respectively. The ends of each loop 28 and 29 pass through openings 29*b* and 28*b* to two rigid copper pins projecting below the head assembly for external connection. The bottom connections are illustrated in FIG. 6*b*.

In order to reduce the shunting of the magnetic flux density by the microgap, the depth of gap 27 is reduced from the original 30 mils, FIG. 7, to 2 mils as shown in FIG. 6*a*. The connecting faces of parts 37*a* and 37*b* are lapped and fastened together by means of screws 38 and 40. Parts 37 and 36 are lapped optically flat and a 50 microinch platinum spacer 27*a* is inserted in the center, at the point of contact between the two halves of the video core. Of course, smaller or larger gap spacers may be utilized; i.e., 25 microinch. It should be noted that two other identical spacers 27*b* and 27*c* are placed at the ends of the head to assure perfect uniformity of the resulting gap 27. The final head face, as shown in FIG. 4, is then lapped to provide a smooth surface for the tape motion. It has been found advantageous to have the top of the recording head finished in a serrated form, i.e., with grooves 51 in the direction of tape motion. This provides for a reduction in area of tape-to-head contact and reduces its wear as well as the possibility of a dirt or dust particle being swept between the tape and head.

The grooves 51 in the head assembly furnish a convenient source of escape for such particles as well as reduce the accumulation of air under the tape. The two halves of the head 36 and 37 are joined by means of screws and aligning pins (note shown) to assure the required precision of the assembly. The pertinent dimensions of the head assembly are tabulated below:

TABLE A

FIG. 4

| | |
|---|---|
| $d_{12}$—0.750 inch | $d_{14}$—9/32 inch |
| $d_{13}$—0.015 inch | $d_{15}$—3/32 inch |

FIG. 5

| | |
|---|---|
| $d_{15}$—0.290 inch | $d_{18}$—0.007 inch |
| $d_{16}$—0.030 inch | $d_{19}$—0.015 inch |
| $d_{17}$—0.004 inch | $d_{20}$—0.004 inch |

FIGS. 6*a* AND 7

| | |
|---|---|
| $g$—0.00005 inch (or less as noted) | $R_2$—0.042 inch |
| | $d_1$—0.042 inch |
| $d$—0.002 inch | $d_2$—0.050 inch |
| A—7° | $d_3$—0.390 inch |
| $A_1$—5° | $d_4$—0.280 inch |
| $A_2$—25° | $d_5$—0.152 inch |
| $R_1$—0.042 inch | $d_6$—0.030 inch |

FIG. 8

| | |
|---|---|
| $A_3$—25° | $d_9$—0.050 inch |
| $A_4$—35° | $d_{10}$—0.100 inch |
| $d_7$—0.020 inch | $d_{11}$—0.465 inch |
| $d_8$—0.040 inch | |

The transport mechanism (shown in FIG. 9) utilized in this development was obtained by modifying a Collaro Tape Deck designated as the Magnavox Studio Tape Transcriptor. In order to move the tape at the speed of 120 inches per second, the capstan 60 is driven at a rate of 3600 r.p.m. The driving motor 66 is a 1/50 horsepower capacitor start-run hysteresis synchronous Model 7346 made by Bodine Company. The torque of this motor is 5.6 inch-ounce. The motor is shielded over its entire length by a mu-metal sheet 70 which is 15 mils thick. The supply and take-up reels 64 and 65 are driven by phonograph type motors 67 and 68 made by General Industries. The reversal of tape motion is obtained by the corresponding direction of rotation of the capstan motor 66. However, the directions of the supply and take-up motor torques 64 and 65 are not reversed for the two directions of motion of the tape. The two motors 67 and 68 driving the reels are continuously exerting their torques in the opposite sense in order to provide the necessary tension in the tape. The adjustment required during tape reversal consists only in changes of the magnitudes of torques in the two motors 67 and 68. This is obtained by controlling the voltage supplied to the motors. Note that the reversible motion of the tape is successfully attained with the use of one capstan 60. As a matter of fact, the motion of the tape in the opposite direction was found more uniform than in the conventional one, i.e., when the capstan 60 is on the supply side. Of course, the above applies when all other conditions have been optimized; i.e., the rollers 61 and 63 and stationary guides 53, 56, 58 and 62 were aligned to prevent vertical pressure and binding of the tape 52. The diameters of the various tape guides are indicated in FIG. 9. The other requirement in the construction of tape guides is the need for a parallel alignment of the tape surface with the axes of the guides. This is obtained by constructing the guides perpendicular to the plane of the tape deck, which thereby services as a reference plane. This is important in the case of the roller 63, FIG. 9, and capstan 60. Capstan roller 61 is particularly susceptible to misalignment since it is a moving element and is mounted on an extending arm 69. Misalignment in capstan roller 61 manifests itself in the appearance of a bubble of skewed tape immediately following the point of contact with the roller. To further insure intimate driving contact the tape contacting surface of capstan roller 61 is less than the tape width. In other words, roller 61 does not directly contact capstan 60. To accomplish this, roller 61 is of reduced non-capstan contacting diameter, except where it contacts tape 52 as indicated by the closely spaced cone-entric circles.

Balance of the supply and take-up reels 64 and 65 is also of importance and because of the high speeds involved, must be considerably better than the balance of commercially available reels in the conventional mode of operation. The deck is shown in the play/record mode. When the unit is stopped pressure pad 57 (urged against the tape linkage 58 and spring 59) and roller 61 move away from tape 52, head 55 and capstan 60.

Another important aspect in the construction of the tape deck is the head positioning device 54. It provides for the elevation of the recording head in steps of 0.025 inch and thus aligns it with the recording tracks on the tape. The next section describes the head positioning device.

FIG. 10 depicts the general assembled view of the head positioning device 54. Most of the assembly constituting the head positioner is made of brass. The head assembly 55 is mounted on a traveling nut 72, which is made of bronze. The head is connected to traveling nut 72 by means of a spring (not shown). The spring is made of hardened steel, which has been heat treated at 1500° F.). and drawn at 750° F. In order to avoid play in the positioning of the head, and thus assure repeatability of channel location, the guide 73 on the body of the positioner in which the head mount slides must be fabricated very accurately; i.e., the dimensions of the grooved channel 73*a* in the positioner (0.116, 0.226 and 0.280 inch) must be attained with the highest conventional machine shop accuracy possible. It is also important that the center line of the head positioner be accurately maintained to provide the required sliding surface for the traveling nut 72. The two holes 74 of 0.116 inch diameter in the body of the head positioner serve to provide access to the mounting screws. Similarly, the semicircular grooves in the traveling nut 72 are also provided to facilitate the assembly of the positioner.

The other components of the head positioner are the drive spring 75, washer 76, index knob 77, the steel ball 81, and a compression spring 78 as a ball and spring detent for index and manual operation of positioner 54. It should be noted that continuous operation of the recorder will require an automated mode of head position activation in order to provide an hour long recording and playback without attendance. The lead screw 79, which is made of stainless steel, has a thread pitch of 40 thereby providing a vertical displacement of 0.025 inch for every turn of the index knob. The retainer 80 and a washer 76 complete the assembly of the body of the head positioner.

The schematic representation and the wiring connections to the recording head are shown in FIG. 11. In the "Record" configuration the high impedance, 1200 turn, video coil 33 does not contribute appreciably to the generation of the recording magnetic field, and thus, the major field-producing current flows through the low impedance, 200 turn video coil 35. In particular, the 24K-ohm resistor $R_3$ in series with the 1200-turn video coil 33 dampens any resonance effects in this high impedance coil. The video-recording signal is obtained through terminal $T_9$ (FIG. 11) from the plate circuit of the video amplifier in the TV set (FIG. 12). The television set utilized was a Zenith receiver Model 14L30 chasis with the circuit modifications shown in heavy line in FIGS. 12 and 14. The audio coils 32 and 34 (2 coils of 1000 turns each connected in series) are connected, during recording, to the output of the audio amplifier terminals $T_6$ and $T_8$ (FIG. 12). The A-C bias for the recording process is obtained from a 2.8 mc. oscillator. The oscillator, shown in FIG. 11, utilizes a 12BH7 vacuum tube $V_1$ operated at a plate current of 70 ma. The output of the oscillator is obtained through a transformer made of a General Q-Type Ceramics' ferrite cup-core. The output of this transformer provides a bias current of 20 ma. peak-to-peak to the video recording coil 35 and a 2 ampere peak-to-peak current to the *x*-field winding 28 or 29. It should be noted that the polarity of the two currents must be such as to generate magnetic field intensities of opposite sense in the region of recording; i.e., in the region between the recording-head gap 27 and the *x*-field winding. As indicated in the description on head construction, two *x*-field windings are provided to be used interchangeably so that the required magnetic field gradients can be obtained on the side of the gap where the moving tape is leaving the region of recording. (In the schematic diagram in FIG. 11 only one *x*-field winding 28 is indicated).

In order to prevent the A-C bias signal from entering the TV set, a trap $C_5$ and $L_{12}$ at the bias frequency is provided in the modifications of the set proper (FIG. 12). Thus, the video signal from the set is fed through the secondary winding of the bias oscillator without the latter affecting the video amplifier of the TV set.

The A-C bias for the audio portion of the recording signal is obtained from the horizontal output transformer of the TV set. The audio signal from the output stage in the TV set is combined with the fundamental frequency of the horizontal sweep (terminals $T_6$ and $T_8$) in FIG. 12) and fed into the audio coil in the recording head $T_{6,8}$ (FIG. 11). The fundamental frequency component of the horizontal sweep is obtained by means of a low-pass filter $R_{16}$ and $C_9$ as shown in FIG. 12.

The recording system is set for playback by turning the switch to the P positions, FIG. 11. In this case the two video coils 33 and 35 are connected in series opposition to give maximum induced potential due to the rate of change of the linked magnetic flux for both high and low frequencies. The high impedance coil 33 resonates at about 250 kc. Since the low-turns coils 35 resonates at a much higher frequency, the two video coils connected in series complement each other thereby extending the total frequency response. At frequencies higher than the resonant frequency of the low-turns video coil 35, the total response reverses phase, since both coils are then above resonance; however, this occurs beyond the useful bandwidth of the system. This, in turn, results only in a slight shift of the fine structure of the image. In the variations of a black and white image representation usually encountered in commercial TV, the phase shift of the fine structure results only in a slight shift of the major outlines of the images. The preceding is, of course, a common case in conventional TV reception.

The video signal is amplified in the video playback amplifier shown in FIG. 13. The first stage consists of a transistor stage, for optimum impedance matching, in the form of a boot-strap amplifier. The gain of this stage is about 10 db. The inductance $L_{16}$ and the RC circuit $R_{23}$ and $C_{14}$ in the collector provide high and low frequency boosts, respectively. The input impedance to the stage is 36K-ohms at 100 kc. and 26K-ohms at 1 mc.

The first transistor stage is coupled to the next stage of amplification by means of a high-frequency RC boost circuit $R_{25}$ and $C_{17}$. The second stage consists of a 6GM6 vacuum tube $V_2$. In its grid-to-ground circuit a peaking coil $L_{17}$ is included as well as a low frequency RC boost circuit $R_{27}$ and $C_{18}$. In the plate circuit a similar network $R_{30}$ and $C_{20}$ is inserted.

The third stage of the video playback amplifier also contains a 6GM6 vacuum tube $V_3$ and compensating components $R_{38}$–$C_{24}$ and $L_{21}$ for high and low frequencies in the plate circuit. The two 1N463A diodes set the level of the output video signal as well as the d-c bias of the video amplifier in the TV set. A one-turn loop $L_{14}$ through the core of the horizontal output transformed in the TV set provides negative pulses for this purpose (FIGS. 12 and 13), terminals $T_{15}$ and $T_4$. The magnitude of these pulses is about 6 volts peak-to-peak as indicated in FIG. 12.

FIG. 13 also indicates the power supply arrangement of the video playback amplifier. It utilizes an RC and an LC filter from components $C_{27}$, $L_{22}$, $C_{28}$, $R_{41}$ and $C_{29}$. The filaments in the two vacuum tubes are supplied with rectified current to reduce hum, and are connected in series.

The flutter in the tape transport may cause deviations in the desired rate of the synchronizing pulses in the video signal. FIG. 14 indicates the modifications in the horizontal control circuits of the TV set. These modifications enable the horizontal sync circuits to follow the deviations of reproduced sync pulses.

The induced potential in the audio coils of the recording head during playback is fed via terminal $T_{30}$ into a two-stage audio amplifier utilizing a 6EU7 vacuum tube $V_4$ (FIG. 15). The amplified and compensated audio output from this amplifier is then applied via coupling capacitor $C_{40}$ and terminal $T_{13}$ to the sound discriminator in the TV set (FIG. 12).

The component values for the circuitry innovations of FIGS. 11–15 are listed below:

FIGURE 11

| | |
|---|---|
| $C_1$—50 μμf. | $L_5$—5T |
| $C_2$—25–200 μμf. | $L_6$—10T |
| $C_3$—170 μμf. (omit for higher frequencies) | $L_7$—1T |
| | $R_1$—100 |
| | $R_2$—10 |
| $C_4$—300 | $R_3$—24K |
| $L_1$—200T | $R_4$—22K |
| $L_2$—1200T | $R_5$—51K |
| $L_3$—2000T | $R_6$—100 |
| $L_4$—10T | |

FIGURE 12

| | |
|---|---|
| $C_5$—5–80 μμf. | $L_{15}$—Sound take-off coil |
| $C_6$—4 μf. | $R_7$—15K |
| $C_7$—330 μμf. | $R_8$—2.5K |
| $C_8$—470 μμf. | $R_9$—4.7K |
| $C_9$—.004 | $R_{10}$—68K |
| $C_{10}$—.001 | $R_{11}$—330 |
| $C_{11}$—.05 | $R_{12}$—7.5K |
| $L_8$—6 μh. | $R_{13}$—33K |
| $L_9$—170 μh. | $R_{14}$—500K |
| $L_{10}$—260 μh. | $R_{15}$—220K |
| $L_{11}$—316 μh. | $R_{16}$—10K |
| $L_{12}$—150 μh. | $R_{17}$—39K |
| $L_{13}$—Secondary of sound limiter transformer | $R_{18}$—10K |
| $L_{14}$—One turn on horiz output transformer | |

FIGURE 13

| | |
|---|---|
| $C_{12}$—.15 μf. | $C_{25}$—.003 |
| $C_{13}$—50 | $C_{26}$—.1 μf. |
| $C_{14}$—.02 μf. | $C_{27}$—20/350 |
| $C_{15}$—25 μf. | $C_{28}$—20/350 |
| $C_{16}$—.047 μf. | $C_{29}$—20/350 |
| $C_{17}$—50 μμf. | $C_{30}$—2000 μf. |
| $C_{18}$—.003 μf. | $L_{16}$—250 μh. |
| $C_{19}$—250 μf. | $L_{17}$—250 μh. |

FIGURE 13—Continued

| | |
|---|---|
| $C_{20}$—.047 $\mu$f. | $L_{18}$—250 $\mu$h. |
| $C_{21}$—8 $\mu$f. | $L_{19}$—500 $\mu$h. |
| $C_{22}$—10/150 | $L_{20}$—6.2 $\mu$h. |
| $C_{23}$—.01 | $L_{21}$—100 $\mu$h. |
| $C_{24}$—.1 | $L_{22}$—7 hy. |
| $L_{23}$—Power transformer H.V. sec. | $R_{28}$—62 |
| | $R_{29}$—4.7K |
| $L_{24}$—Power transformer L.V. sec. | $R_{30}$—7.5K, 1W |
| | $R_{31}$—1K, 2W |
| $L_{25}$—Power transformer primary | $R_{32}$—20K |
| | $R_{33}$—47K |
| $R_{19}$—10K | $R_{34}$—56K |
| $R_{20}$—10K | $R_{35}$—1M |
| $R_{21}$—1K | $R_{36}$—62 |
| $R_{22}$—150K | $R_{37}$—3K |
| $R_{23}$—18K | $R_{38}$—5.1K, 1W |
| $R_{24}$—33K | $R_{39}$—470K |
| $R_{25}$—12K | $R_{40}$—22K |
| $R_{26}$—120 | $R_{41}$—4K, 5W |
| $R_{27}$—47K | |

FIGURE 14

| | |
|---|---|
| $C_{31}$—100 $\mu\mu$f. | $R_{43}$—330K |
| $C_{32}$—2×51 $\mu\mu$f. | $R_{44}$—330K |
| $C_{33}$—200 $\mu\mu$f. | $R_{45}$—1M |
| $C_{34}$—2×500 $\mu\mu$f. | $R_{46}$—220K |
| $C_{35}$—470 $\mu\mu$f. | $R_{47}$—100K |
| $R_{42}$—1M | |

FIGURE 15

| | |
|---|---|
| $C_{36}$—4 $\mu$f. | $R_{49}$—5.1K |
| $C_{37}$—.0033 $\mu$f. | $R_{50}$—500K |
| $C_{38}$—390 $\mu\mu$f. | $R_{51}$—51K |
| $C_{39}$—4 $\mu$f. | $R_{52}$—500K |
| $C_{40}$—.01 $\mu$f. | $R_{53}$—1.5K |
| $C_{41}$—20/250 | $R_{54}$—100K |
| $R_{48}$—100K | $R_{55}$—62K, 1 W |

FIG. 16 shows the record-playback frequency response characteristic of the Video Recorder. The response extends to 2.2 mc. at the high end and to about 200 cycles at the low end. The normal recording level is approximately 35 to 40 db above the broad-band noise level. These characteristics are considered satisfactory for a low-cost, non-professional recording unit.

The frequency response indicated in FIG. 16 results in a playback picture image quality of acceptable level. Live recording may be obtained by the use of an inexpensive television camera where the signal is converted to RF and picked up on channel 6 of the television receiver. The final playback image is influenced not only by the tape recording system, but also by the camera and the RF and IF sections of the television receiver.

To obtain the curve presented in FIG. 16, the recording was made using a bias frequency of 3.8 mc. The bias current in the $x$-field winding was 2.2 amperes peak-to-peak. The bias current in the signal winding was 15 milliamperes peak-to-peak. The recording signal current was set at a normal recording level, which is 3 milliamperes peak-to-peak. This recording level is on the order of 8 to 10 db below tape saturation. As shown, 0 db is defined at 1.0 volt peak-to-peak input to the grid of the television video amplifier which is used for recording.

In FIG. 17 the preferred electronic circuitry is schematically illustrated. The head windings are the same as previously described in connection with FIG. 11 and therefore the same reference numerals are applied. The circuitry enclosed in box 301 includes the record/playback electronics separate from the TV set. Also included is the motor circuitry and control. This unit is connected to the TV set by means of a suitable cable. The cable end adjacent the TV set may terminate in a plug which includes the connector board circuitry shown in box 302. Alternatively, these components can be incorporated into box 301 or 303. The RP switches in 302 are preferably linked to the RP switches in 301 as by relay (rel.) attached to cable lead A.

Interposed between the first two stages of amplification (2N708 and 6GM6-box 301) between the collector and control grid is an RLC network. The network is frequency responsive and designed to provide a phase shift in the same manner as occurs as the signal transcends the cross-over region of windings 33 and 35. This phase shift occurs between 150 and 500 kilocycles, because of the use of two windings which results in increased gain at the low and high ends of the frequency band. In this way an improved overall frequency repsonse is obtained.

A half wave rectifier (1N2071) and a variable resistor is connected between the reel motors to provide a DC drag on the supply reel motor depending on the direction of tape travel, the take-up motor being energized by AC.

Transistor 2N708 and the two 6GM6 vacuum tubes provide three stages of video amplification for more than adequate overall gain. The 2N3391A (box 301) transistor provides a single stage of audio amplification prior to coupling the signal into control grid of the sound discriminator of the TV set. The "discriminator" tube serves as an audio amplifier during tape playback.

As in the previous embodiments the TV chassis utilized was a Zenith 14L30. That portion of the chassis utilized and modified (as previously described) is enclosed by box 303.

When units 302 and 303 are unplugged at ABCDEFGHIJK, a dummy plug may be inserted into the socket at 303, the dummy plug having jumpers connecting C to D, and F to G. The TV set may then be used independently of the video recorder.

The bias and $x$-field is provided by the 12BH7 (box 301) dual triode oscillator tube. The circuit is designed to provide a signal of between 2–6 megacycles. The output of the oscillator is inductively coupled to the $x$-field windings (28 or 29) and the video record winding 35.

The cable connections between boxes 301 and 302 to connect the units is as follows:

| Terminal: | Signal |
|---|---|
| **1** | Common ground. |
| **4** | Video playback signal. |
| **6, 8** | Audio record signal. |
| **9** | Video record signal. |
| **13** | Audio playback. |
| **15** | Relay for RP selector in **302**. |

The LC circuit connected between terminals 1 and 9 is a trap to block the oscillator frequency from the video circuits in the TV set.

FIG. 18 is the completely transistorized equivalent of the circuit shown in box 301 of FIG. 17, and therefore, as an equivalent it is also the preferred. This circuit embodiment includes a negative feedback network between the first two stages of video amplification (16L64's) and serves the same purpose as the network described with reference to FIG. 17. The first stage also has negative feedback to its base through a 39K resistor, and to its emitter through a 150 ohm resistor connected to third stage emitter circuit. These resistors stabilize the DC operating points and give low frequency correction.

The maximum overall video gain of this circuit is between about 1,000 and 10,000 varying as a function of frequency. Actually the transistorized circuit gives greater high frequency response and higher gain than the vacuum tube version shown in FIG. 17.

The cable connections are the same as described with reference to FIG. 17. In FIG. 17 the capacitance indicated by whole numbers are in $\mu\mu$f. and those indicated by fractions are in $\mu$f. unless otherwise indicated. In FIG. 18 all capacitance values are in $\mu$f. In both FIGS. 17 and 18 the inductances are in microhenries.

In FIG. 17 the 1N463A diodes in 302 connected to cable lead 4 are of the silicon junction type having a very high resistance in the forward direction until the forward potential exceed about 0.5 to 0.7 volt. This feature has been found very advantageous, as it allows a precise setting of the sync pedestal level and still permits the picture signal to make large excursions without clipping.

The circled component values in box 303 of FIG. 17 represent optimum values for the circuits involved as compared to the original values. The original values will provide satisfactory operation but the circuit as shown is revised for optimum performance.

In FIGS. 19 and 20 another *x*-field head construction is shown.

FIGS. 19 and 20 illustrate a combined-erase record-playback head. The head comprises a series of legs 115, 120, 121 and 122 providing erase gap 111, a *x*-field gap as indicated at 112 and a record-playback gap as indicated at 125. A conductive loop element 110 extends through erase gap 111 and *x*-field gap 112 and an erase-bias coil 114 is on an outer leg 115. The head includes legs 115, 120, 121 and 122 defining erase gap 111, *x*-field gap 112 and record-playback gap 125 with a bias and signal winding assembly 126 on leg 122 which may be connected with erase-bias coil 114. By way of example, the loop electric circuit 110 may have a width or height dimension of .020 inch and a thickness dimension of .002 inch. The loop electric circuit serves to increase the coupling of the erase-bias coil 114 to the *x*-field magnetic circuit including legs 120 and 122 during recording.

During recording, bias and erase high frequency current is supplied between terminals 150 and 151 to energize winding section 153 on leg 115 and winding section 154 on leg 122 in series opposing relation. This produces high frequency erase fields at gap 111 and produces a high frequency field impinging on leg 122 at the recording region 160 opposing the bias field produced by winding 154 in this region. The recording signal may be supplied between terminals 162 and 151 to energize coil 154 with the signal to be recorded. The high frequency bias field component from winding 153 acts to modify the bias field to provide a sharp gradient of bias field intensity in the recording region 160 as in the previous embodiment.

During playback, an output amplifier is connected between terminals 162 and 181 so as to connect a winding section 183 in series with winding section 154. In this case the winding 153 is not used during playback.

Leg 121 may comprise .0005 inch "Permalloy," "Supermalloy," "Deltamax" or "Supermandur," and gap spacer 127 defining gap 125 may comprise a strip of copper having a thickness of 0.00005 inch. Trailing leg 122 may have substantially less width than the other legs and may have filler members at the opposite sides thereof to compensate for width difference.

The phrase "poles defining a recording gap" as used in the claims of course refers to the regions adjacent the recording gap of the magnetic core at which the recording signal flux is concentrated. The term "polar faces" refers to the surfaces of such poles converting the record medium path. The term "pole pieces" refers to the magnetic material at the poles which is shaped to concentrate and direct the external recording signal flux at the recording gap.

Obviously many modifications will occur without departing from the novel spirit and scope of this invention.

I claim as my invention:

1. A magnetic transducer assembly comprising in combination:

a magnetic core including a transducing gap for recording on a record medium;

conductive means spanning said core in a position close to said transducing gap; and means coupled to said conductive means for generating a bias field to increase substantially the magnetic field gradient at the trailing pole of said magnetic core;

said conductive means being spaced about 0.004 inch from said transducing gap in the direction of travel of the record medium.

2. A magnetic transducer head comprising in combination:

a magnetic core having a pair of poles in confronting relation to define a transducing gap over which a record medium is to travel;

winding means coupled to said poles for producing a magnetic signal field across said gap;

a loop circuit element traversing said core in the vicinity of said gap but before said gap and including a conductor in advance of said gap a distance of about 0.004 inch and extending transverse to the direction of tape travel; and bias means coupled to said circuit element for generating a bias field having a substantial magnitude in the recording region of said transducing gap.

3. A magnetic transducer head comprising in combination:

a magnetic core having confronting leading and trailing poles to define a transducing gap over which a record medium is to travel;

winding means coupled to said poles for producing a magnetic signal field across said gap; and an electric circuit element traversing said core and disposed on the leading pole, and spaced from said gap by a distance of about 0.004 inch in the direction of tape travel.

4. A magnetic transducer assembly comprising in combination:

a magnetic core including a transducing gap for recording on a record medium at a recording zone of the magnetic core;

loop conductive means including a pair of conductors spanning said core in a position close to said transducing gap but spaced from said gap by respective different distances; and means coupled to said conductive means for generating a bias field of substantial magnitude at the recording zone of said magnetic core to increase the magnetic field gradient at the recording zone.

References Cited

UNITED STATES PATENTS

| | | | |
|---|---|---|---|
| 2,418,542 | 4/1947 | Camras | 179—100.2 |
| 2,803,708 | 8/1957 | Camras | 179—100.2 |
| 3,262,124 | 7/1966 | Johnson et al. | 179—100.2 |
| 2,615,097 | 10/1952 | Camras | 179—100.2 |
| 3,013,123 | 12/1961 | Camras | 179—100.2 |
| 3,060,279 | 10/1962 | Harrison | 179—100.2 |
| 3,159,822 | 12/1964 | Hagopian | 346—74 |

BERNARD KONICK, Primary Examiner

J. R. GOUDEAU, Assistant Examiner

U.S. Cl. X.R.

340—174.1; 346—74